United States Patent [19]

Liles et al.

[11] Patent Number: 5,880,731

[45] Date of Patent: *Mar. 9, 1999

[54] USE OF AVATARS WITH AUTOMATIC GESTURING AND BOUNDED INTERACTION IN ON-LINE CHAT SESSION

[75] Inventors: Christopher A. Liles, Seattle; Manuel Vellon, Bellevue, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 572,307

[22] Filed: Dec. 14, 1995

[51] Int. Cl.$^6$ ........................................................ G06F 3/00
[52] U.S. Cl. .......................... 345/349; 345/358; 345/473; 345/330
[58] Field of Search ...................................... 395/329, 330, 395/331, 332, 348, 349, 358, 806, 807, 957, 960, 972; 345/329, 330, 331, 332, 348, 349, 358, 302, 957, 960, 972, 473

[56] References Cited

U.S. PATENT DOCUMENTS

| | | | |
|---|---|---|---|
| 5,257,306 | 10/1993 | Watanabe | 395/330 X |
| 5,347,306 | 9/1994 | Nitta | 395/330 X |
| 5,491,743 | 2/1996 | Shiio et al. | 395/330 X |
| 5,572,248 | 11/1996 | Allen et al. | 395/330 X |
| 5,613,056 | 3/1997 | Gasper et al. | 395/806 X |
| 5,617,539 | 4/1997 | Ludwig et al. | 395/330 X |
| 5,682,469 | 10/1997 | Linnett et al. | 345/473 |

OTHER PUBLICATIONS

Carlsson et al., "DIVE—a Multi–User Virtual Reality System", IEEE Virtual Reaity Annual International Symposium, pp. 394–400, Sep. 1993.

Ohya et al., "Real–time Reproduction of 3D Human Images in Virtual Space Teleconferencing", IEEE Virtual Reality Annual International Symposium, pp. 408–414, Sep. 1993.

Robinett, "Interactivity and Individual Viewpoint in Shared Virtual Worlds: The Big Screen vs. Networked Personal Displays", Computer Graphics, vol. 28, No. 2, pp. 127–130, May 1994.

Benford et al., "Supporting Cooperative Work in Virtual Environments", The Computer Journal, vol. 37, No. 8, pp. 653–668, 1994.

Fukuda, Kazutomo et al., "Hypermedia Personal Computer Communication System: Fujitsu Habitat," Fujitsu Sci. Tec. J., 26, 3, pp. 197–206.

Primary Examiner—Matthew M. Kim
Assistant Examiner—Crescelle N. dela Torre
Attorney, Agent, or Firm—Ronald M. Anderson

[57] ABSTRACT

Avatars representing participants in a graphic chat session are periodically animated to produce a gesture that conveys an emotion, action, or personality trait. Each participant in the chat session is enabled to select one of a plurality of different avatars to represent the participant in a graphic chat session. Associated with each avatar is a bitmap file that includes a plurality of frames illustrating the avatar in different poses, actions, and emotional states. Selected frames are displayed in rapid sequence in accord with a script file to create an animation effecting each gesture. The same script file is used to define a gesture for all of the avatars used in the chat session. A selected gesture can be transmitted with a text message to convey the user's emotional state. A gesture associated with the avatar is automatically displayed from time to time when the avatar is not otherwise gesturing or moving. The user can determine participants in the chat session with whom the user will interact, e.g., by defining a proximity radius around the user's avatar or by selecting the specific participants from a list. Avatars of participants that are outside the proximity radius (or otherwise not selected) and messages received from them are not displayed on the user's monitor.

31 Claims, 9 Drawing Sheets

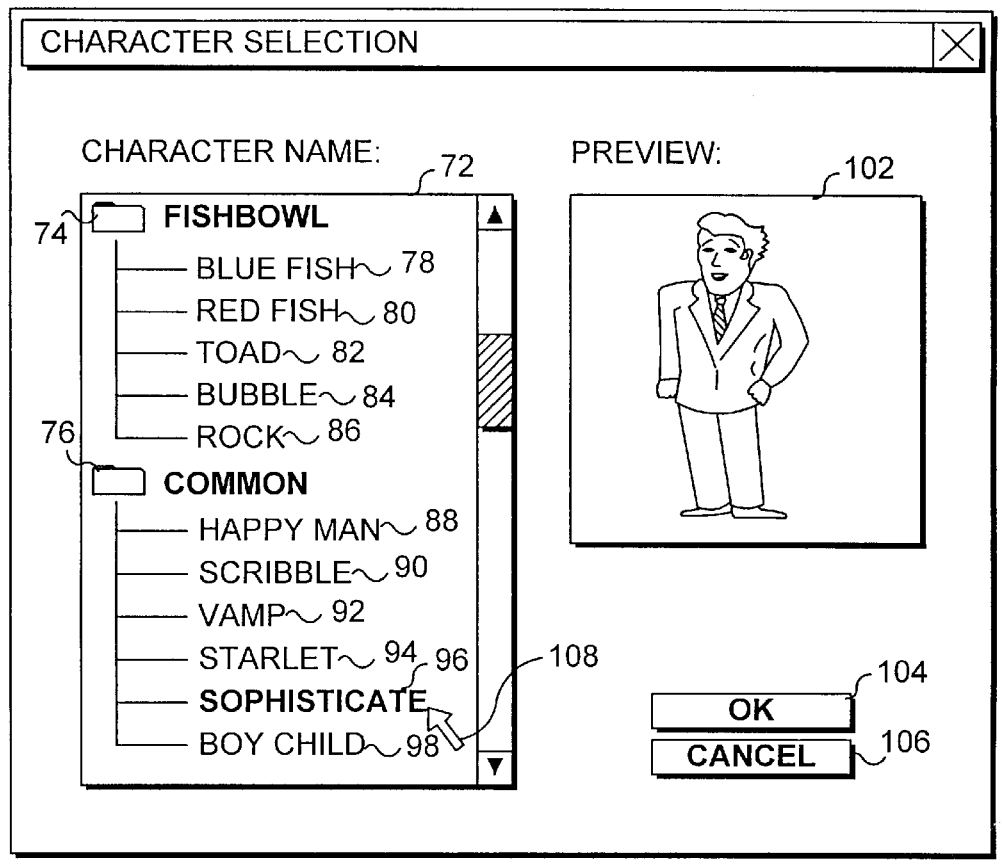
*FIG. 3*
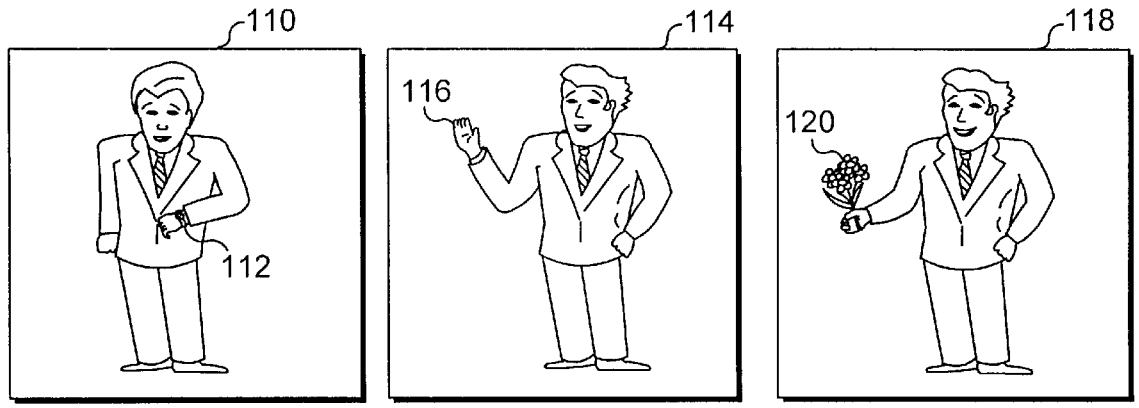
*FIG. 4A*  *FIG. 4B*  *FIG. 4C*

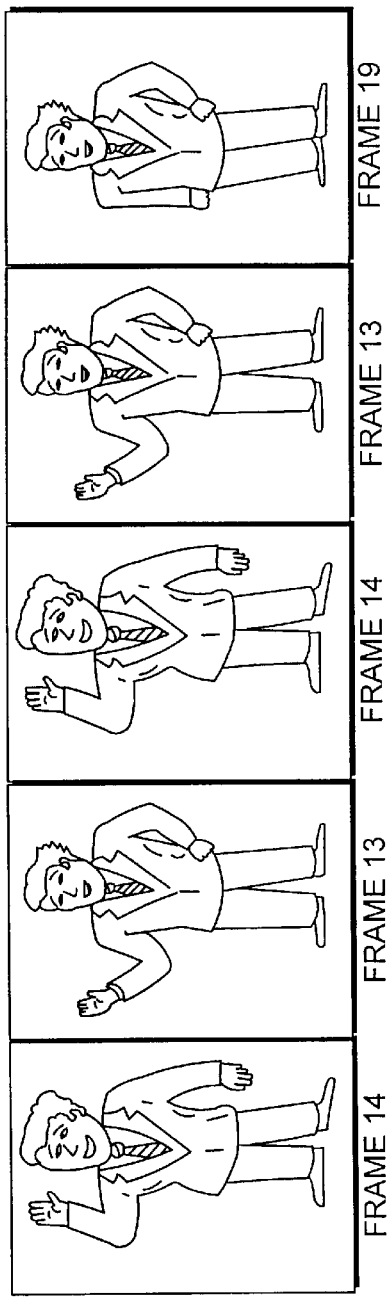
FIG. 6
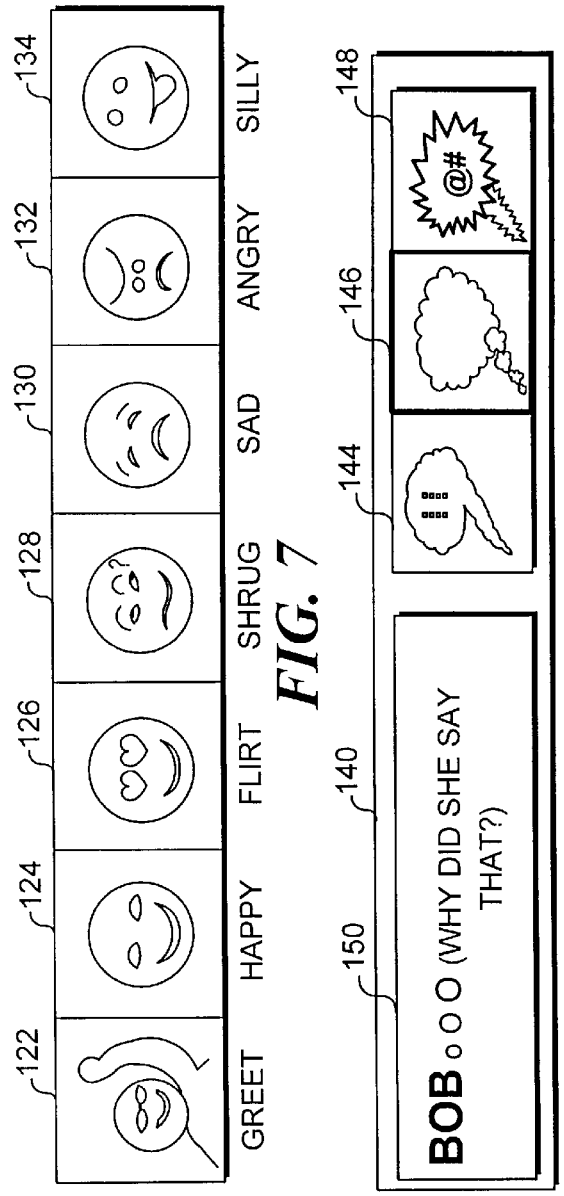
FIG. 7
FIG. 8

USE OF AVATARS WITH AUTOMATIC GESTURING AND BOUNDED INTERACTION IN ON-LINE CHAT SESSION

FIELD OF THE INVENTION

The present invention generally relates to the use of graphic representations of participants in a chat session, who are communicating using linked computers, and more specifically, it relates to the animation and interaction of avatars (graphic icons) representing the participants.

BACKGROUND OF THE INVENTION

Use of the computer for communicating on-line with others has recently become much more popular with the increased awareness by the public of the Internet and of services provided by commercial service networks. In addition to enabling access to information, exchange of e-mail messages, and downloading of files, a link to the Internet or to a commercial service network provides an individual with the opportunity to interact with others who are connected to the network.

One of the more common options for enabling several users of an on-line service to interact is through a chat session. A user joining a chat session is added to a list of participants and can then view comments transmitted by other participants and enter and transmit a response. In text only chat sessions, each user's screen is typically divided into two panes. Comments that have been transmitted by those participating in the chat session appear in one pane, and any message being entered by the user appears in the other pane on the user's computer display screen. For practical reasons, chat sessions are usually limited to a predefined number of participants. If any person attempts to join once the limit is reached, the person is typically notified that the chat session is full and precluded from joining. Alternatively, the person may be offered the opportunity to join another separate chat session on the same topic in which others are participating. In chat sessions involving a well known personality, hundreds of people may join the session, but only the host and the moderator are active in the chat session, and all others are simply observers. However, provision may be made to enable questions previously submitted by the observers to be displayed to solicit a response from the guest. The host controls the chat session. The virtual space in which each chat session occurs is sometimes referred to as a "room," since the participants interactively communicate just as if they were meeting in a room.

With the increasing use of modems operating at speeds of 28.8 Kbps on commercial networks, graphical chat sessions are becoming more practical. In a graphical chat session, all of the participants are represented by avatars or icons that are grouped in a graphic environment or "world." In addition to a graphic window showing the chat world, the display screen on each participant's computer typically still includes the chat pane and the message entry pane, as described above. When another user joins the chat session, the person's identifier, moniker, or name is added to a list of the participants, and an avatar for the new participant is added in the graphic chat world. The list normally appears in a third pane. When any participant leaves the chat session, the withdrawal is noted in the member pane, and the avatar representing the person is removed from the graphic chat world.

Although the graphic chat session provides visual information that improves a participant's knowledge of the other participants, the approach for displaying the participants in a conventional graphic chat world is somewhat stilted and artificial, because it fails to convey much information about the personality and emotional state of the participants as the chat session progresses. A graphic chat session of this type is implemented in the Worlds Chat paradigm, which was developed by World, Inc. In a Worlds Chat session, each avatar is associated with a plurality of bitmap sprites, each sprite representing the avatar from a different angle. The multiple views of each avatar do not provide any animation. A user can customize the sprites that represent him/her by modifying these bitmaps using a conventional paint program and a format conversion program that is provided by World, Inc.

In the ImagiNation Network (INN) developed by AT&T, users can customize their avatars by selecting various facial components such as the eyes, nose, and hair style from predefined options, in a manner much like that used in police identikits to create a likeness of a person. The avatars that are thus automatically produced blink their eyes at random times, but this limited animation fails to convey any emotion, action, or personality trait of the individual who is represented by the avatar.

Even though the particular avatar selected by a person and any customization applied with a paint program may reveal some of the individual's personality, such avatars are generally too static in nature and do not reflect the changing emotional state associated with the text messages transmitted by a participant in a graphic chat session. Ideally, a chat session in a virtual world should convey the same kinds of visual interaction that might occur in an actual face-to-face meeting of the people involved in a discussion, and the avatars representing the participants should thus clearly indicate the personalities of each individual and the emotions that are associated with the words communicated between the participants. Although present technology does not permit an ideal virtual world to be achieved during an on-line graphic chat session, it should be possible to animate the avatars sufficiently so that they can convey gestures that represent these traits. When people converse, gestures are an important facet of the communication, since they indicate the personality and emotional state of the speakers. In a graphic chat session, gestures can provide the same visual clues that they provide in a normal conversation. Although gestures are normally used in conversation without conscious thought, in a graphic chat session, it would be preferable for a participant to be able to select the gesture that will be used in combination with text that is transmitted to indicate the emotion or state of mind associated with the communication.

There are times when a participant in a chat session may wish to limit those with whom the person interacts. For example, if a discussion between two of the people involved in the chat session is of particular interest to a third party, the third person may not want to be distracted by communications transmitted from others in the chat session. In many cases, the participant may want to enable only selected persons in the chat session to view his/her avatar and the messages that are sent to those persons; however, this type of interactive control is currently not practical. Yet, it should be possible to selectively limit the group of participants with whom a person interacts so that only selected avatars in the chat session are seen by the person and so that only communications from the selected members of the group are observed by the person. Moreover, it would be preferable to select the members of the limited group that will be observed by the participant in a more graphical and natural manner.

When two people want to speak privately in a room, they simply move away from the others in the room so that their private conversation is not audible beyond the range of the other person with whom they are conversing. A similar approach should be applicable to limit those with whom a person interacts in a graphic chat world. Currently, no conventional graphic chat session provides a technique to spatially select the avatars of others that the participant wants to observe and from whom communications will be received. Providing this feature will enable a participant to perceive the avatars of those selected and to receive communications only from those members of the chat session who have been selected. The participant will not perceive the avatars or communications from those who are in the chat room, but were not selected.

SUMMARY OF THE INVENTION

In accord with the present invention, a method is defined for communicating a gesture by an avatar that represents a participant in an on-line graphic chat session. The method includes the step of providing an animation in which the avatar appears to move in a defined manner that conveys the gesture. During an idle period for the participant in the chat session, when the avatar is otherwise inactive, the animation is automatically initiated without requiring any input by the participant.

The method preferably also includes the step of providing the participant with a plurality of avatars. The participant is enabled to select the avatar that will represent the participant in the chat session.

The animation comprises a gesture chosen from a plurality of gestures, at least some of which are indicative of a personality trait and/or an emotion. Furthermore, the participant is enabled to select and initiate an animation employing the avatar, where the animation conveys a desired emotion and/or state of mind to another participant in the chat session. The animation selected by the participant to convey the desired emotion and/or state of mind may selectively be displayed in combination with a textual message that is transmitted by the participant.

Another aspect of the present invention is directed to a method for enabling a plurality of different gestures to be implemented by a plurality of different avatars that represent participants in an on-line graphic chat session. This method includes the step of providing a different script for each of the gestures. Each script is applicable to all of the plurality of avatars used in the chat session, and each gesture comprises a sequence of visual frames. The visual frames portray different views of an avatar to produce a visual impression of an animation of the avatar when rapidly displayed in the sequence. In the script for each gesture, specific visual frames comprising the sequence and time intervals determining a duration for displaying each visual frame of the sequence are indicated. The avatars representing participants in the chat session are caused to implement desired gestures by selectively executing the scripts for the desired gestures.

Yet another aspect of the present invention is directed to a system for use in enabling a participant in an on-line chat session who is represented by an avatar to indicate a personality trait and/or an emotion to others in the on-line chat session. The system includes an interface to a network on which the on-line chat session is being run; the interface enables the participant to transmit and receive data over the network. A display is provided for displaying a graphic representation of a virtual space in which the on-line chat session is occurring. Also included in the system is a memory for storing machine instructions, and a central processor for executing the machine instructions. The machine instructions, when executed by the central processor, cause the central processor to control the interface and the display. The central processor thus causes an animation of the avatar in the virtual space. This animation comprises a plurality of frames that are played in sequence so that the avatar appears to move in a defined manner within the virtual space. Movement by the avatar represents a gesture when viewed by others participating in the on-line chat session. During an idle period for the participant in the chat session, when the avatar representing the participant is otherwise inactive, the animation is automatically initiated.

Functions performed by the system in connection with the present invention are generally consistent with the steps of the methods described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3 is a character selection dialog box enabling a user to select an avatar to represent the user in an on-line graphic chat session;

Figure 5:
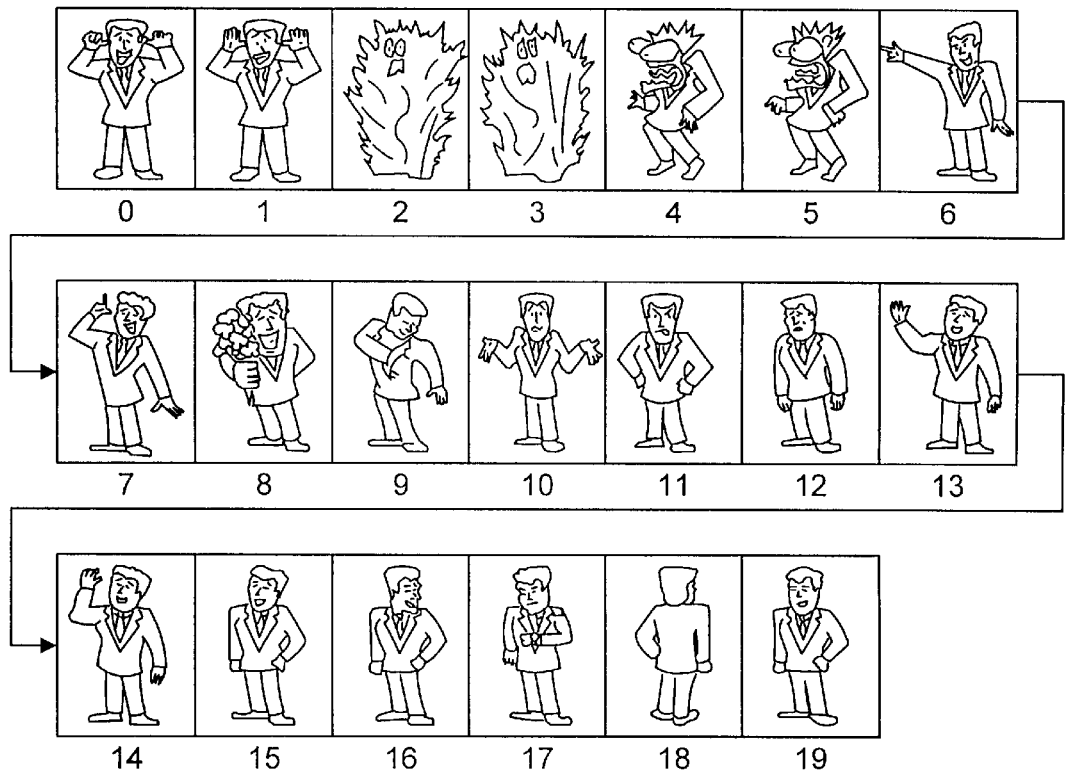
Figure 9:
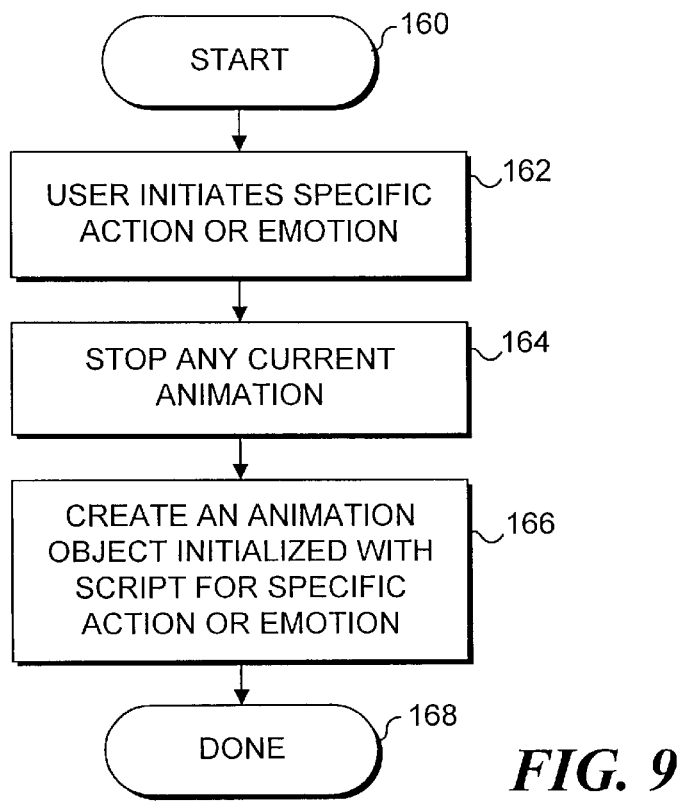
Figure 10:
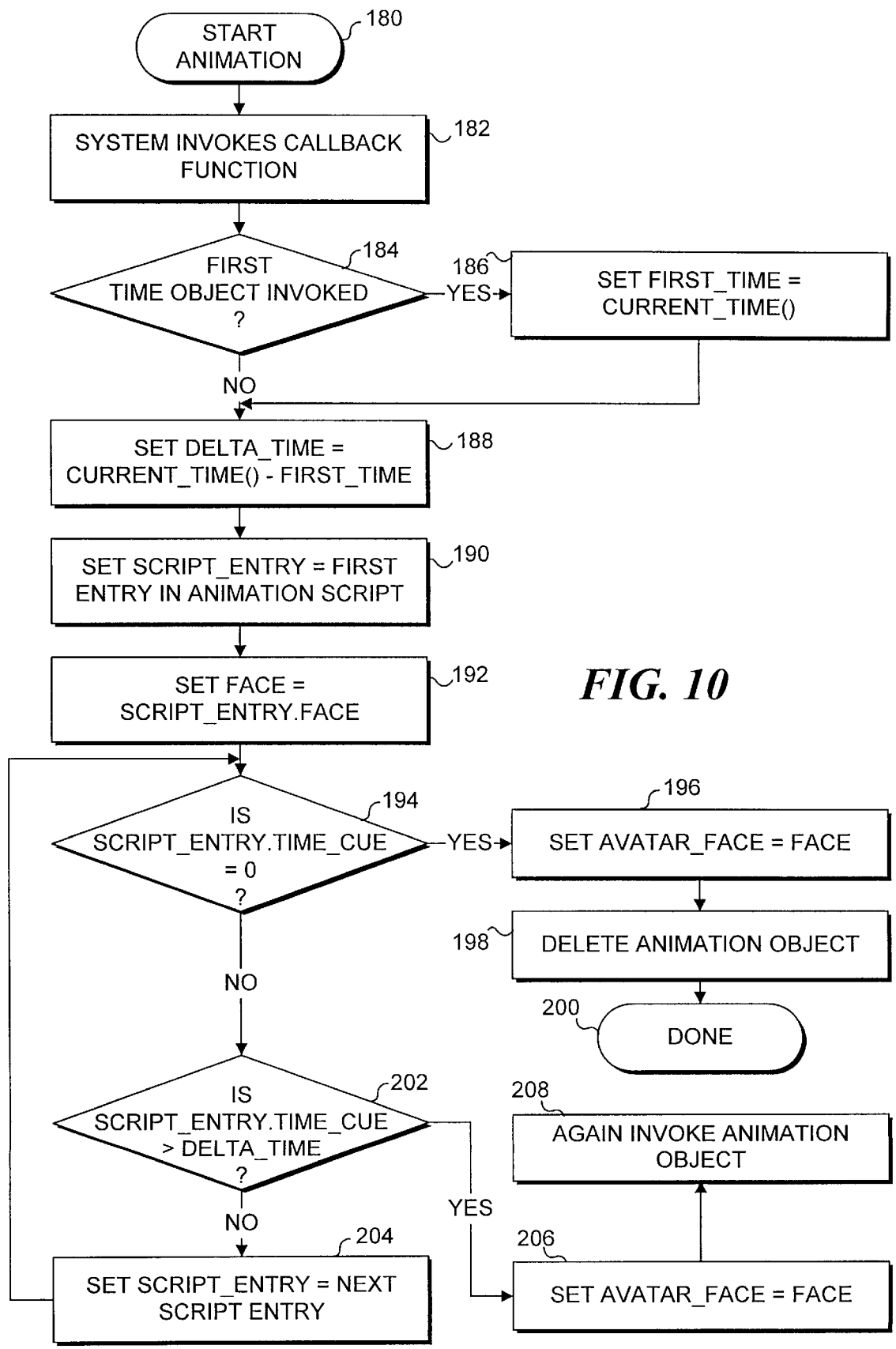
Figure 11:
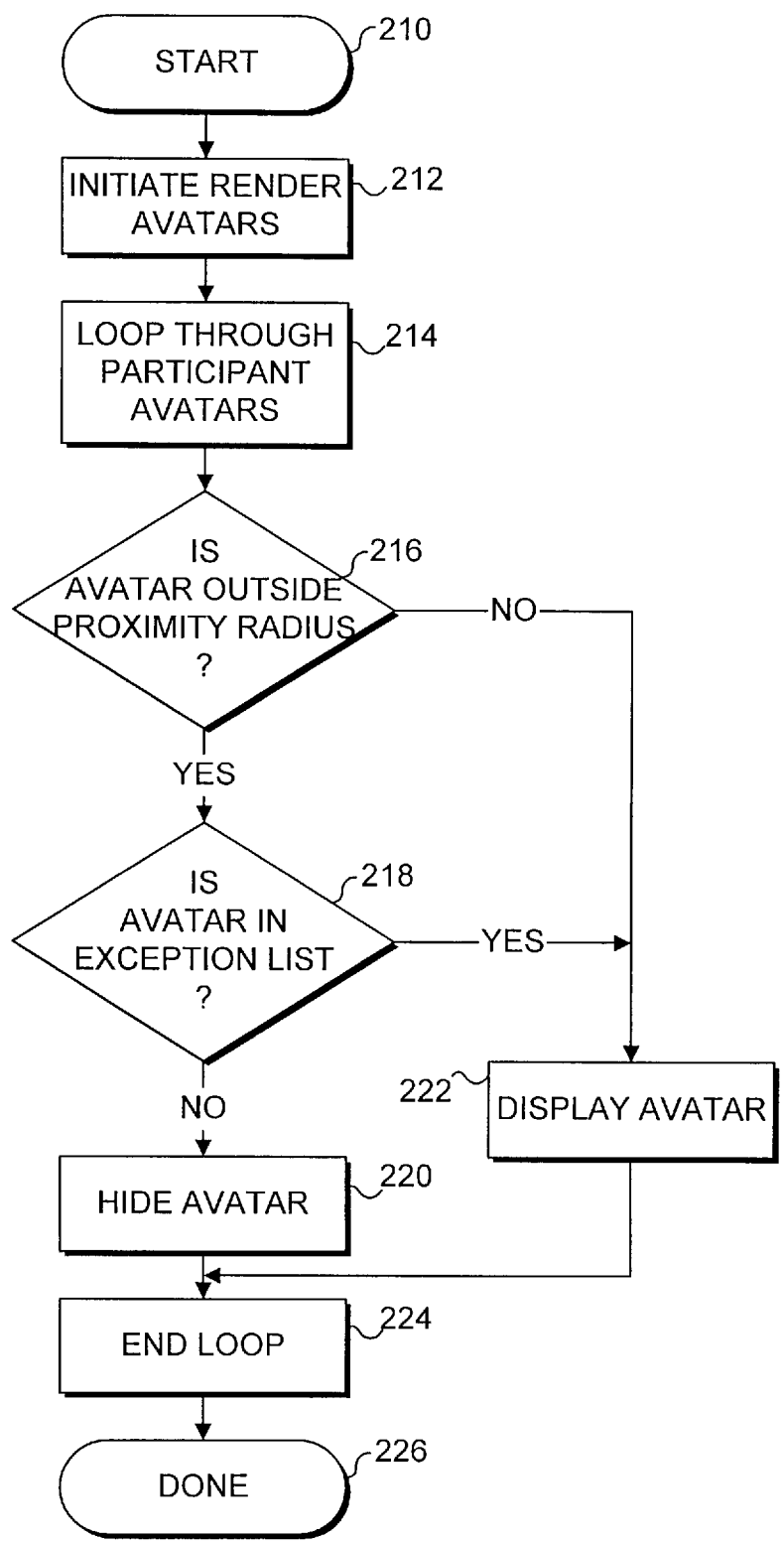
Figure 12:
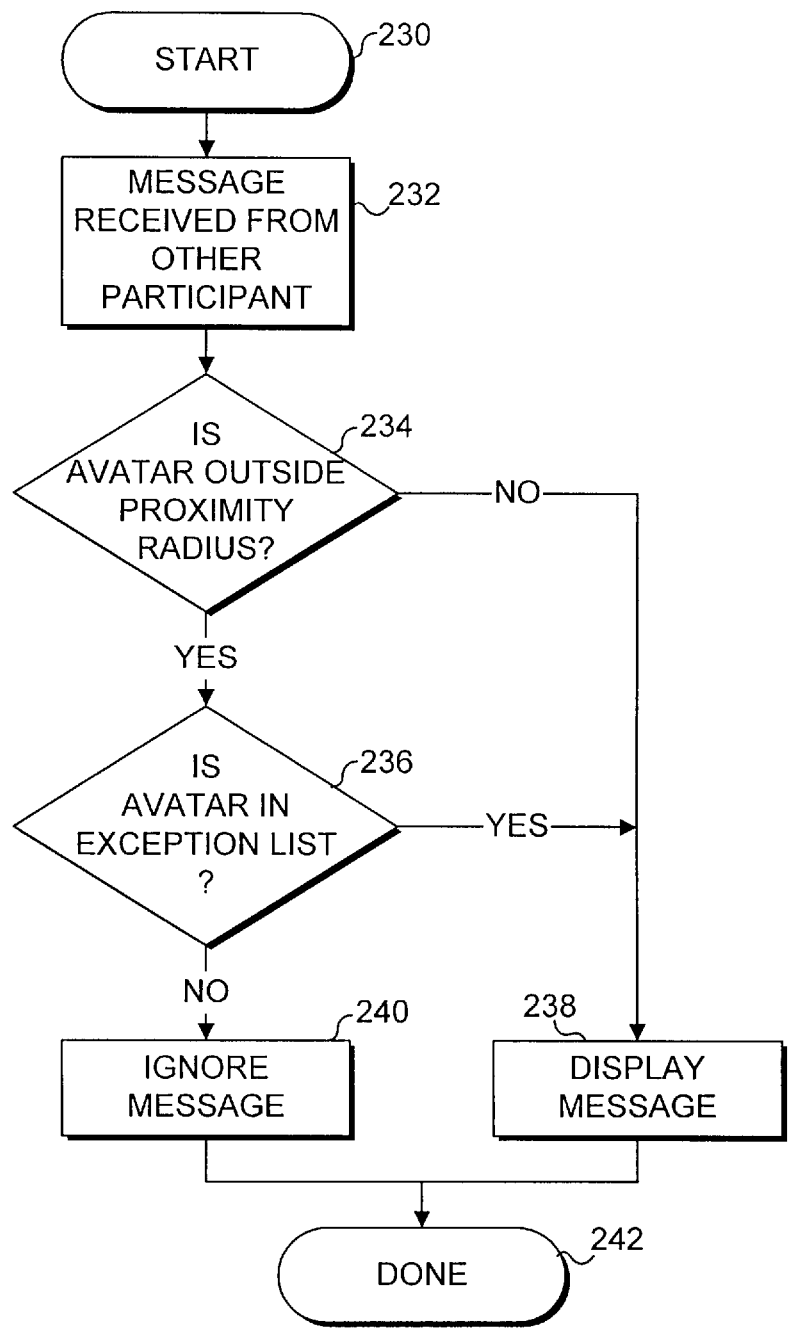
Figure 13:
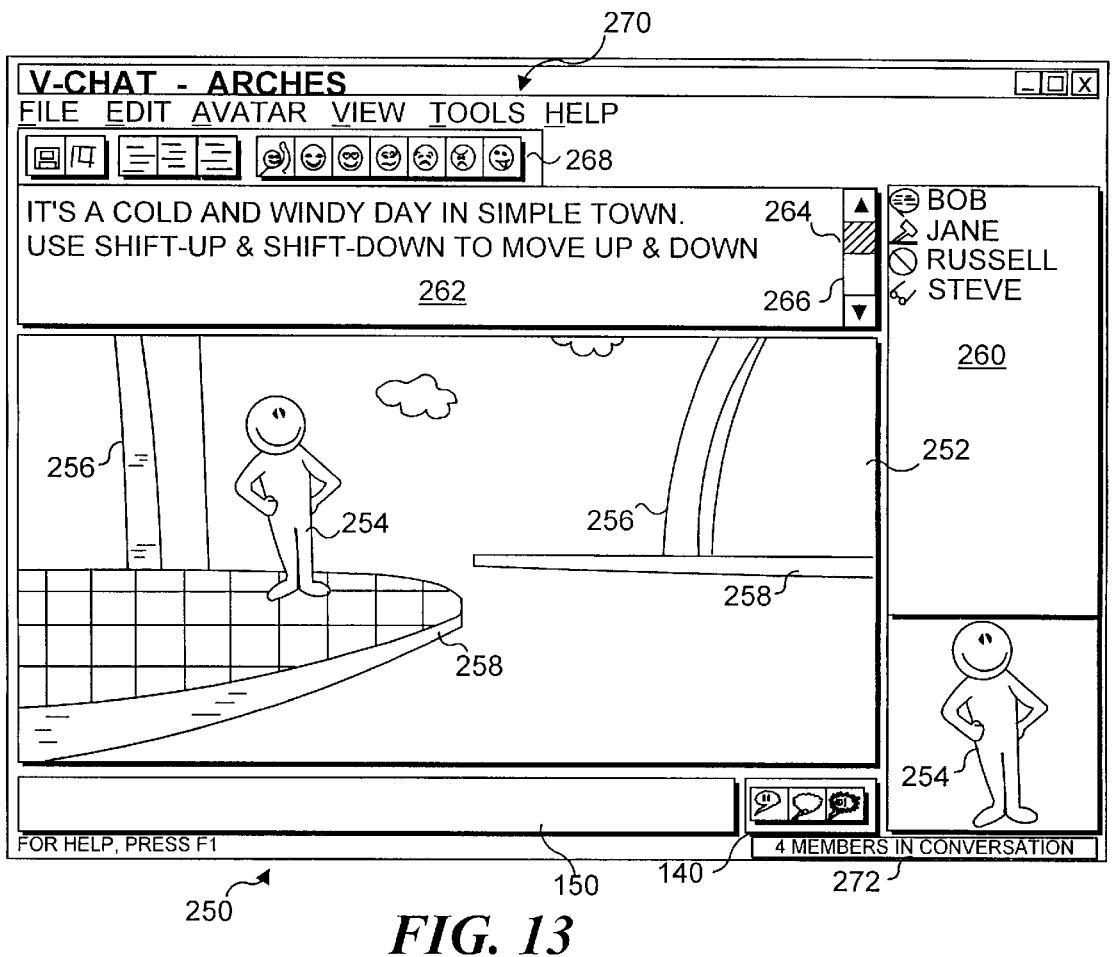
Figure 14:
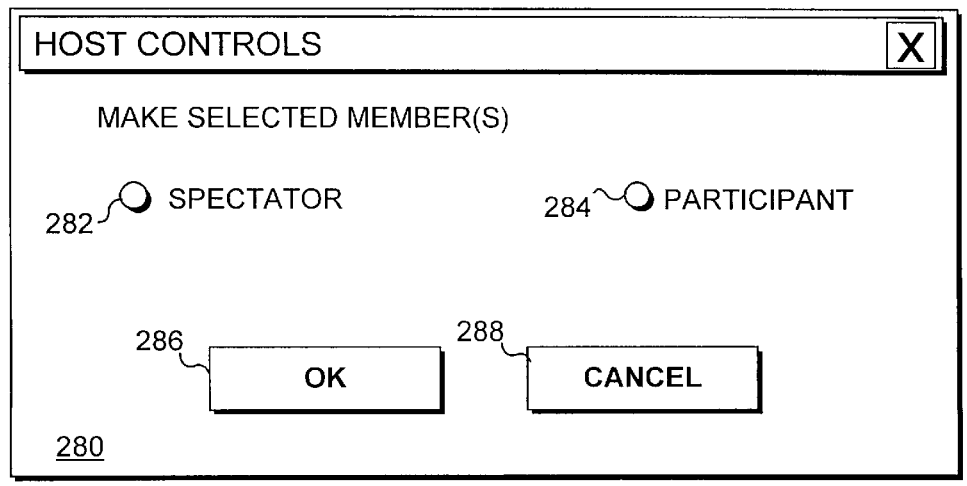
Figure 15:
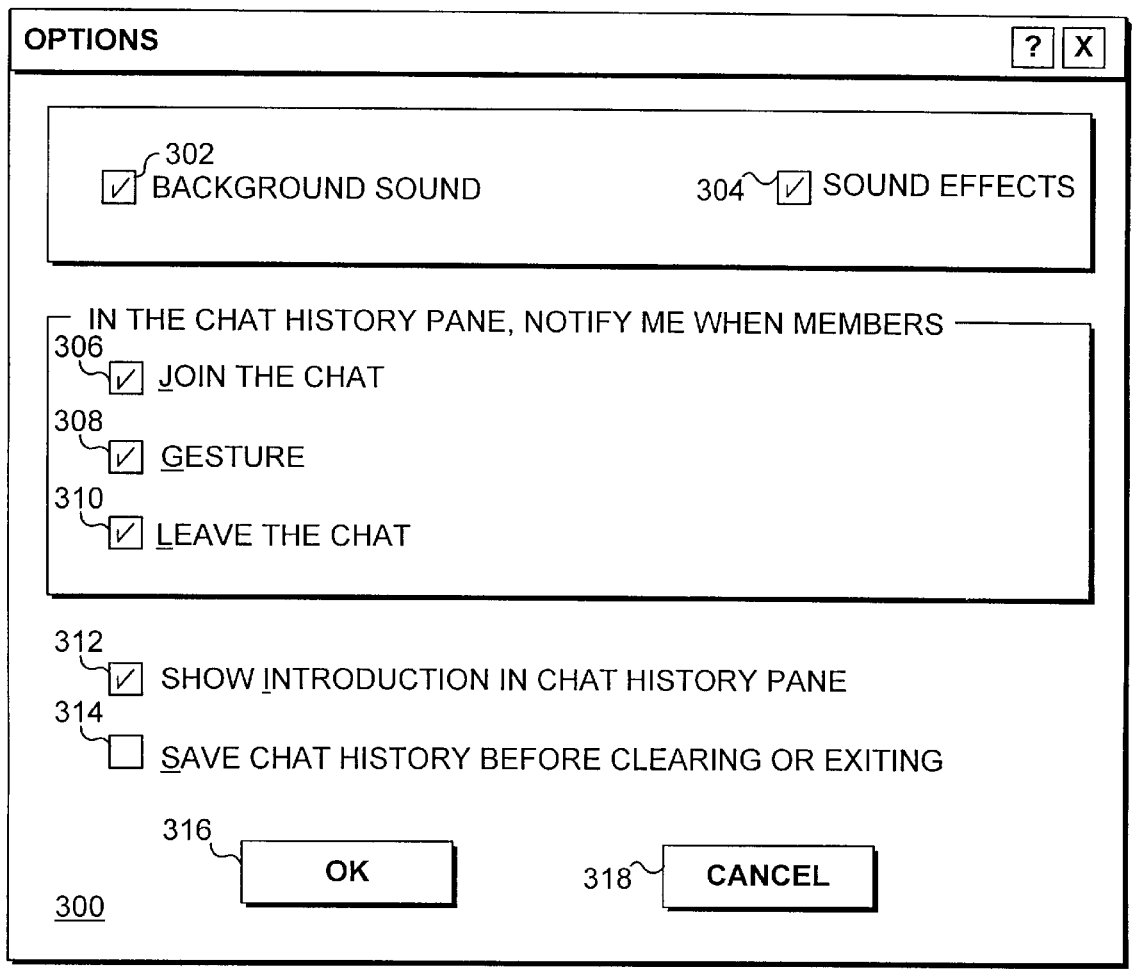
Figure 16:
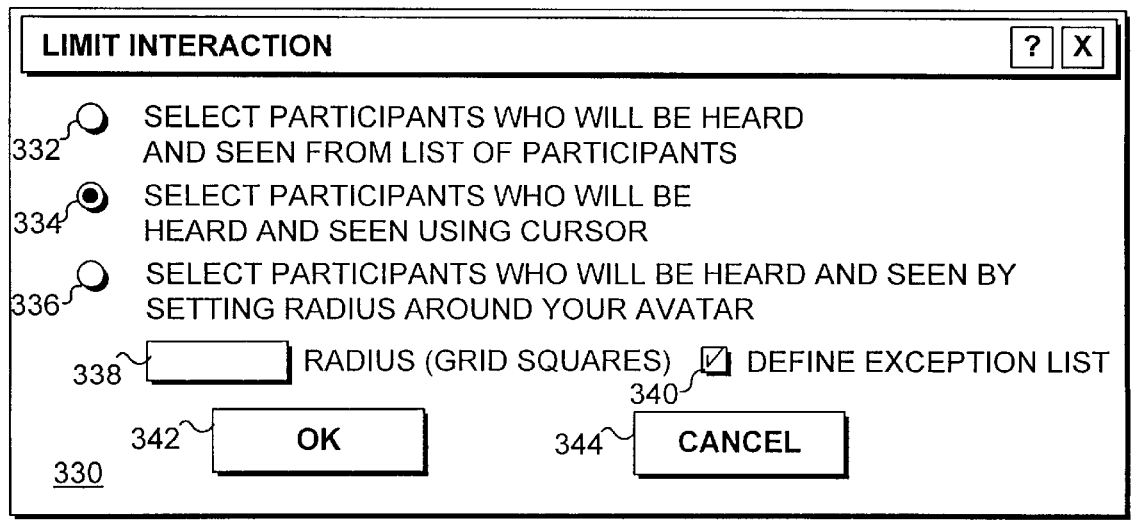

FIGS. 4A, 4B, and 4C respectively illustrate frames showing different gestures that are selectively executed by an exemplary avatar in accord with the present invention;

FIG. 5 illustrates a sequence of nineteen frames included in a bitmap file showing different views of an exemplary avatar;

FIG. 6 is a sequence of five frames that are played as defined by a script to produce a gesture animation of the exemplary avatar;

FIG. 7 is a dialog box illustrating a plurality of controls that can be selected by a user to control the animation of the avatar representing the user in an on-line chat session;

FIG. 8 is a text box in which the user enters a text message and defines the nature of the text message;

FIG. 9 is a flow chart that defines the logical steps implemented in displaying a gesture by executing an animation of an avatar;

FIG. 10 is a flow chart showing the logical steps followed to create an animation by following a predefined script;

FIG. 11 is a flow chart that illustrates the logical steps followed in selecting the persons that can communicate with a participant in the on-line chat session;

FIG. 12 is a flow chart that shows the steps for determining whether a message from another person is displayed to a participant;

FIG. 13 is a screen showing an example of an introductory virtual world or room displayed when a user joins a chat session;

FIG. 14 is a host control dialog box that is used by a monitor of the chat session to determine those who are participants and those who are spectators of a chat session;

FIG. 15 is an options dialog box that enables a user to select various options for the graphic chat sessions; and FIG. 16 is a dialog box showing the options available to the user to limit interaction with other participants in the chat session.

DESCRIPTION OF THE PREFERRED EMBODIMENT

Figure 1:
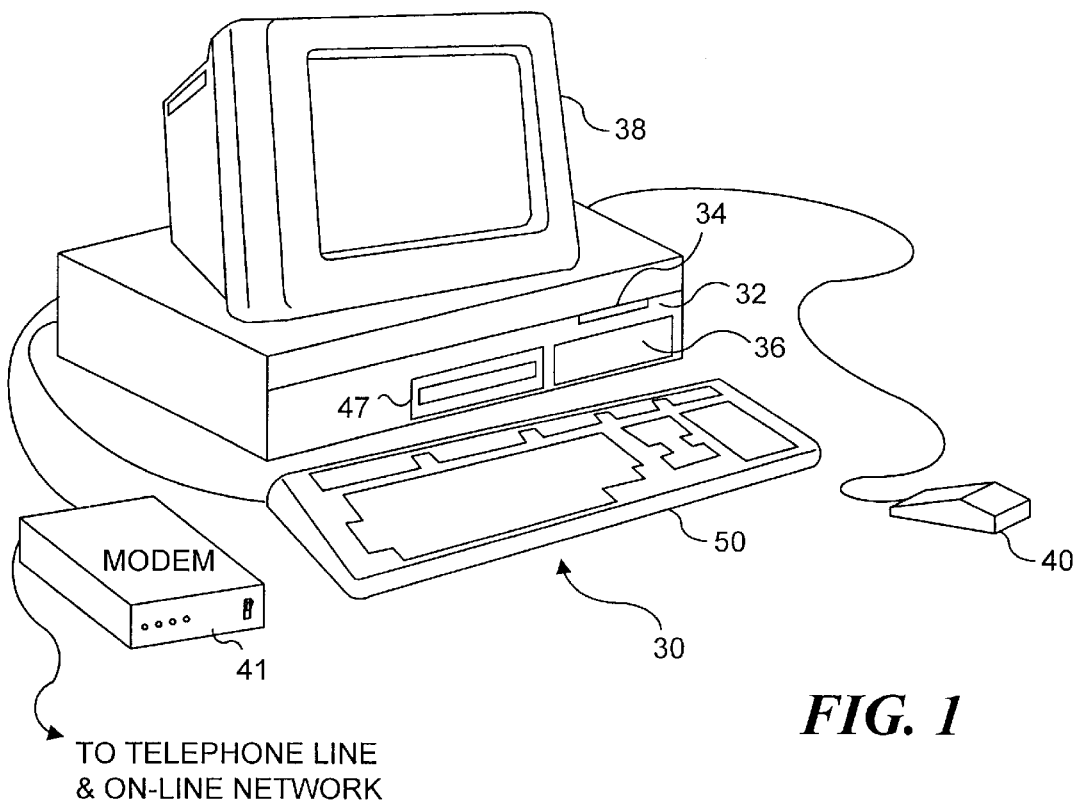
FIG. 1 is a schematic block diagram showing a personal computer and modem suitable for use in implementing the present invention.

With reference to FIG. 1, a personal computer 30 is illustrated as an example of the type of computer typically used by a participant in a chat session in connection with the present invention. Although the personal computer is of the type intended to run Windows 95™, it is contemplated that other types of personal computers, such as those made by Apple Computer Corporation, will also be usable in executing software to implement the present invention. Personal computer 30 includes a processor chassis 32 in which is mounted a floppy disk drive 34, which is suitable for reading and writing data from and to a floppy disk (not shown), and a hard drive 36 suitable for nonvolatile storage of data and executable programs. A monitor 38 is included for displaying graphics and text produced when an executable program is being run on the personal computer and for use in connection with the present invention, for displaying a graphic chat session to a user.

Input can be provided to personal computer 30 using either a mouse 40 for manipulating a cursor (not shown) on monitor 38, which is used for selecting menu items and graphic controls displayed on the monitor by pressing an appropriate selection button (not shown) on the mouse, or by input entered by the user on a keyboard 50. Optionally, processor chassis 32 includes a CD-ROM drive 47, which is suitable for reading programs and data from a CD-ROM. To enable personal computer 30 to communicate during an on-line chat session, an external modem 41 is coupled to a serial port on processor chassis 32. Optionally, a modem may be included internally within processor chassis 32. The modem also connects to a telephone line to convey signals bi-directionally between computer 30 and a server at a remote on-line service (not shown) to which other participants in a chat session are connected in a similar fashion.

Figure 2:
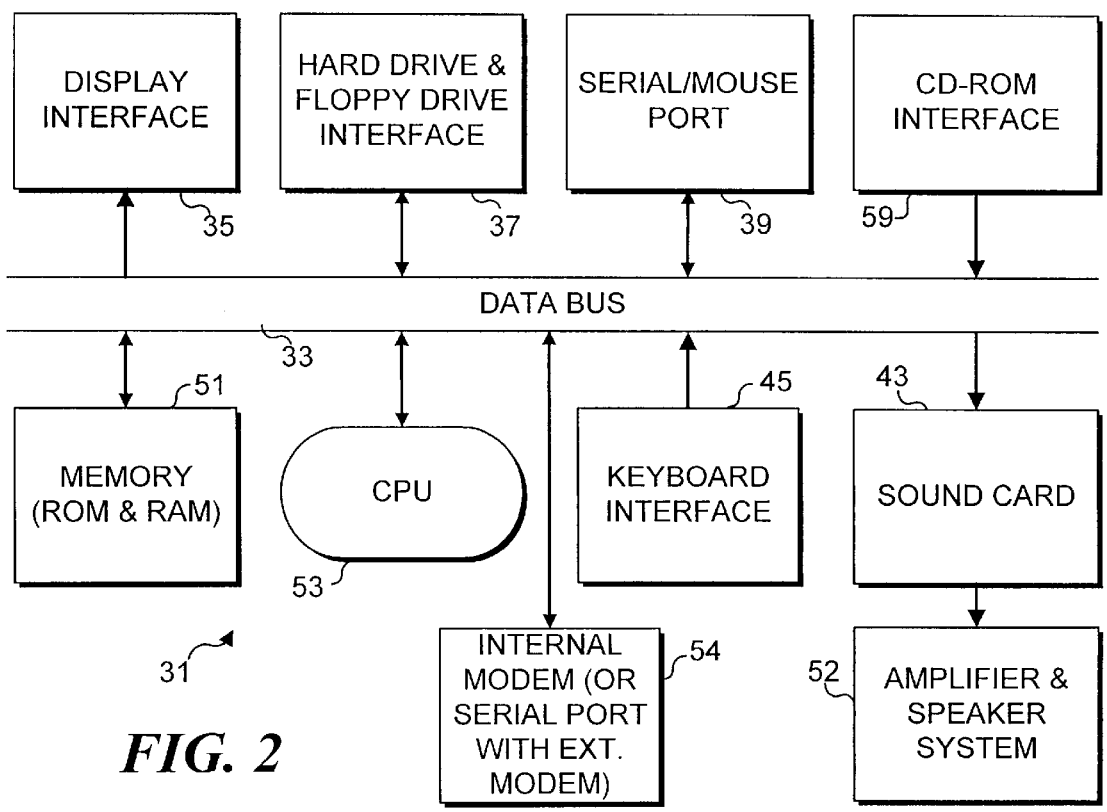
FIG. 2 is a block diagram illustrating components of the personal computer that are included within its processor chassis.

FIG. 2 shows a block diagram 31 in which components housed within processor chassis 32 are illustrated. A motherboard (not shown) includes a data bus 33, which provides bi-directional communication between these components and a CPU 53. The components include a display interface 35, which drives monitor 38, providing the video signals necessary to produce a graphic display during the chat session and when running other executable programs running on the personal computer. A hard drive and floppy drive interface 37 provides bi-directional communication between floppy drive 34 and hard drive 36, and data bus 33, enabling data and machine instructions comprising executable programs to be stored and later read into a memory 51. Memory 51 includes both a read only memory (ROM) and random access memory (RAM). The ROM is used for storing a basic input/output operating system (BIOS) used in booting up personal computer 30 and other instructions essential for its operation. Machine instructions comprising executable programs are loaded into the RAM via data bus 33 to control CPU 53.

A serial/mouse port 39 provides an interface for mouse 40 to data bus 33 so that signals indicative of movement of the mouse and actuation of the buttons on the mouse are input to CPU 53. An optional CD-ROM interface 59 couples optional CD-ROM drive 47 to data bus 33 and may comprise a small computer system interface (SCSI) or other appropriate type of interface designed to respond to the signals output from CD-ROM drive 47. Optionally, a sound card 43 is connected to data bus 33 and its output is coupled to an amplifier and speaker system 52 to provide a sound capability for personal computer 30. Output signals from keyboard 50 are connected to a keyboard interface 45, which conveys the signals from the keyboard to data bus 33. If external modem 41 is not used, an internal modem 54 can be provided, which is coupled directly to data bus 33. Alternatively, external modem 41 can be connected to the data bus through a serial port of personal computer 30.

It should be noted that instead of using a conventional modem, other types of digital adapters can be used to couple personal computer 30 to a telephone line. For example, an integrated services digital network (ISDN) would be a desirable alternative to the modem, since the ISDN interface can transfer data at a rate of 64 Kbps or more. At such a data transfer rate, there is very little delay in updating a screen on the monitor during a graphic chat session.

In connection with the present invention, it is contemplated that each participant in a graphic chat session will select a particular avatar to represent the person in the virtual world or room portrayed on monitor 38. Depending upon the subject matter of the chat session, a number of different, but appropriate, avatars will be provided from which a participant may make a selection. For example, if participating in a chat session involving gardening, a participant might select an avatar that appears as a gardener (male or female), a flower, a bee, a frog, a bird, or some other icon related to the subject. Moreover, as will be described below, a participant will have the opportunity to customize the avatar selected and alter the appearance of the avatar as used in various gestures or animations that can occur during a chat session.

The present invention provides the participant with a number of predefined avatars that can be selected to represent the individual in a chat session for a particular subject. This selection may be done when the participant is off-line, prior to making a connection with the service that runs the chat session. The software that enables the participant to select an avatar and to participate in a graphic chat session can either be downloaded from the service, or might be distributed on a floppy disk or CD-ROM disk. After the software is downloaded or transferred from the floppy disk or CD-ROM disk into personal computer 30, it can be executed by CPU 53, causing a dialog box to be displayed on monitor 38, so that the user can make a selection of the avatar for use in a graphic chat session. Alternatively, the selection may be made on-line, as appropriate for the subject matter of a graphic chat session that the user is joining.

FIG. 3 shows a character selection dialog box 70 that enables the user to select the avatar that will represent the user in an on-line chat session. Character selection dialog box 70 includes a block 72 in which folders 74 and 76 are displayed. Folder 74, which is entitled "Fishbowl," includes a plurality of bitmap files 78 through 86, each of which have names identifying various avatars associated with the fishbowl subject, including a Blue Fish 78, a Red Fish 80, a Toad 82, a Bubble 84, and a Rock 86. Similarly, folder 76 entitled "Common" includes a plurality of files 88 through 98 that identify additional avatars, including a Happy Man 88, a Scribble 90, a Vamp 92, a Starlet 94, a Sophisticate 96, and a Boy Child 98. Whereas the avatars provided in folder 74 might be appropriate for a chat session dealing with fish, those in folder 76 are more general in nature. Still other avatars can be selected by scrolling through the dialog box to display additional folders containing different groups of avatars.

In the example portrayed in FIG. 3, character selection dialog box 70 includes a cursor 108 that has been used to select Sophisticate 96 as the avatar that will represent a user. A preview box 102 illustrates the avatar associated with Sophisticate 96. Controls 104 and 106 respectively enable the user to confirm (OK) the selection or Cancel it.

When connected to an on-line service and participating in the chat session, the avatar selected by the user in character selection dialog box 70 will appear in the virtual world or room with the avatars of the other participants. The virtual world is displayed in either a two-dimensional or three-dimensional mode. In addition, the user's identification or name will be added to the list of participants in the chat session. The user can move his/her avatar around within the room with mouse 40 and can turn the avatar to change the view of the other participants in the chat session that the user perceives on the monitor.

In addition to the view of the avatar appearing in preview box 102 when the avatar is selected, each avatar has a number of other different views that are employed in animations used to convey gestures. These gestures can be selected by the user for display to the other participants in a chat session in connection with a text message transmitted by the user. For example, in each of FIGS. 4A through 4C, the Sophisticate avatar is respectively shown in a different view used in three gestures. In a gesture represented by a view 110, the avatar is checking a watch 112; the gesture represented by view 110 might be selected to indicate that the user is impatient or to indicate that the user must leave the chat session because of an appointment. A gesture represented by a view 114 shows the avatar raising a hand 116 to wave at the other participants in the chat session; this gesture might be used in connection with greeting a friend who has just joined the graphic chat session. A gesture represented by a view 118 in FIG. 4C shows the Sophisticate avatar holding a bouquet of flowers 120 and might be employed when making an apology to a female participant for a harsh comment previously transmitted during the chat session. Alternatively, the gesture represented by view 118 could be used in connection with a flirtatious communication transmitted from the user represented by the Sophisticate avatar and directed to another participant.

Each of the avatars that are presented to a user for selection in character selection dialog box 70 corresponds to a different bitmap file. Each of the bitmap files contains a predefined number of frames that represent the avatar in different poses and/or emotional states. In FIG. 5, frames 0 through 19 illustrate various views of the Sophisticate avatar. Since these frames are all included within a single bitmap file, the user is free to customize any frame in the bitmap file by opening the bitmap file within a paint program and modifying the expression on the avatar's face, the position of the avatar's limbs or other features, or any other aspect of the avatar, in any of the frames as desired. However, any of these frames may be employed in one or more of a plurality of gestures that are predefined. The frame numbers used in a predefined gesture are the same for all of the avatars employed in a chat session for a particular virtual world or room. Typically, several of the frames are displayed rapidly in sequence on a participant's monitor to produce an animation conveying a specific gesture. As is well known to those skilled in producing cartoon animations, the rapid display of a sequence of frames in which a figure is portrayed in slightly different poses causes the figure to appear to move in an animated fashion.

Each gesture is controlled by a script defined by the designer of the graphic chat session room. The designer specifies all of the animation scripts that define the gestures that will be supported in that room. Each animation script for a gesture has the form:

```
Gesture name
    Time cue, avatar frame (from bitmap file)
    Time cue, avatar frame (from bitmap file)
    ...
    End of gesture code
```

In each script file, the Gesture name is the name applied to the gesture as it appears to the user in a chat session interface. The Time cue is a time interval, which is measured in milliseconds, running from the time that the gesture is initiated on a participant's monitor. The Time cue parameter specifies the time that a specific avatar frame of the frames in the avatar bitmap file should be displayed. For example, the script for the "Greet" gesture is:

```
"Greet"
    1,      14
    500,    13
    1000,   14
    1500,   13
    2000,   19
    0,      0
```

In the above example, one millisecond after the Greet gesture is initiated, frame 14 is displayed, as shown in FIG. 6. Five hundred milliseconds after the start of the gesture, frame 13 is displayed, followed in order by frame 14, frame 13, and frame 19, each at 500 millisecond intervals. Frame 19 is the frame for the avatar that is used when an animation is not running, i.e., the "normal view" of the avatar. The 0,0 entry in the script file marks the end of the gesture. Other script files may include additional or fewer frames and may display the frames for different time intervals than indicated in this example. Since the frames are presented in a relatively rapid sequence to the user on monitor 38, the gesture appears as an animation in which the avatar moves to convey the gesture and then assumes the normal position.

In the Greet gesture, the Sophisticate avatar waves his hand. If the user has selected a different avatar, the same numbered frames from the other avatar's bitmap file will be used when the script file for the selected gesture is executed. Therefore, all of the avatar bitmap files for a particular chat session space in this preferred embodiment have the same number of frames in a common order in the bitmap files, and each frame will typically depict a generally equivalent pose or emotion if the animation that is run when a gesture is selected is intended to correspond to the name of the gesture. Therefore, the bitmap files for all of the other avatars used in the chat space in which the Sophisticate avatar is used will also have twenty frames, with the nineteenth frame portraying the neutral or normal pose for each avatar.

However, different avatars may portray the same gesture in very different ways. For example, the nineteenth frame may portray the avatar as a man standing on his head or as a bird on a branch. The Greet gesture for a female avatar might portray the female avatar performing a curtsey, or blowing a kiss, rather than waving her hand. Thus, a user has considerable latitude in customizing the actions or animations performed by the avatar in response to each of the predefined scripts employed for a particular room of a chat session. So long as the user maintains the same number of frames in the bitmap file as are used for all of the avatars in the chat space, the artwork depicting the frames for each avatar can be modified by the user completely as desired. This option gives the user considerable latitude in customizing the avatar and the animations conveying the gestures implemented by the avatar. Once the bitmap file for a user's avatar is customized, it can be selectively published, i.e., uploaded to the server maintained by the service on which the chat session runs, so that other participants in a chat session can download the customized bitmap file into hard drives of their computers. If a participant in a chat session has not downloaded the customized bitmap file of the user, when the user joins the chat session, the participant will see an amorphous ghost-like image that represents the user. Once the participant downloads the customized bitmap file for the avatar of the user, the user's customized avatar and gestures will be apparent to the participant.

In the preferred form of the present invention, each of the avatars has a gesture associated with it that is initiated at random times when the avatar is not otherwise moving or performing a different gesture. For example, the Sophisticate avatar shown in the preceding example may from time to time perform a Smile gesture. Although the preferred embodiment of the present invention provides for the designer of the chat space assigning a specific gesture to each avatar to be run during the idle times for the avatar, it is contemplated that the user be enabled to select this gesture that will run automatically. The gesture selected to run automatically for a particular avatar may then be chosen by the user to fit the user's personality and can be customized as described above. The automatically initiated gestures ensure that avatars in a chat session are animated, even if most of the participants in the chat session are not actively otherwise participating.

Various predefined gestures are provided in the script files for a typical graphic chat session, as indicated in FIG. 7. These animations are presented to a user in a gesture toolbar that includes gestures 122 through 134, and the user is given the option to select the gesture that will be initiated at random times. The graphic icons included on the toolbar are simply illustrative of the type of gesture and do not represent the appearance of the avatar selected by the user. The labels under the graphic icons indicate the personality trait, action, or emotion portrayed by the gesture, enabling a user to select a gesture based upon these label criteria. For example, if the user wishes to initiate a gesture 128 in response to a question to which the user does not know the answer, his avatar will follow a script that causes the avatar to be animated to produce a Shrug gesture. The details of the Shrug gesture may be very different for each avatar. The graphic icons on the controls used for initiating such gestures are sometimes referred to as "emoticons," since the gesture initiated by selecting one of these controls portrays an emotional state or personality trait of the user.

In the preferred embodiment, gestures are not embedded or associated with text messages that are transmitted by a participant for display to other participants. However, it is contemplated that a user will be enabled to select a gesture to accompany text that is transmitted for display to the other participants in the chat session. The gesture thus selected will provide emphasis of the user's emotional state in connection with the text message. Currently, in the preferred embodiment of the present invention, the user can select a gesture that indicates the user's emotional state in response to a prior communication within the chat session, for transmission without accompanying text, but a selected gesture and a text message can readily be transmitted together.

Textual messages transmitted to the other participants can indicate what the user is saying or thinking, and alternatively, can indicate a related action or emotional condition of the user. In FIG. 8, a text box 150 is provided to enable the user to compose a message to be transmitted to the other participants in the chat session. A "text balloon" control 144 can be selected by the user before transmitting the text typed into text box 150 to indicate that the text should be treated as a verbal communication. The other participants would see a message from Bob that reads, "Bob says hello," in response to a transmission from Bob of the text "hello," using text balloon control 144. Alternatively, as shown in the example, the user can select a "mental thought balloon" control 146 to indicate that the test represents the user's thoughts. As shown in text box 150, a user named Bob is thinking "Why did she say that?" The other participants would receive the message in the form shown in text box 150 and would understand that this message is in the form of a thought. In the third option, an emote control 148 can be selected to indicate that the text being transmitted represents an action or an emotional response. The other participants might receive text reading "Bob faints with laughter," in response to a message transmitted from Bob using emote control 148 that reads "faints with laughter." In the graphic chat room, it is contemplated that the text transmitted will be included within corresponding cartoon balloons like those represented on controls 144 through 148. Thus, the other participants in the chat session will understand the nature of the communication received from the user. Although not included in the current preferred embodiment, it is expected that such text messages will more clearly convey the user's current emotional state, if accompanied with an appropriate gesture effected by the user's avatar.

In FIG. 9, a flow chart illustrates the steps involved in performing a gesture using an animation defined by a script file. This procedure begins with a start block 160. In a block 162, a user initiates an animation object to produce a gesture to convey a specific action or emotion, for example, by selecting one of gesture emoticons 122 through 134. The selected gesture, as noted above, may optionally accompany a text message. In a block 164, any animation that was previously initiated is interrupted. Next, in a block 166, the animation object associated with the gesture selected by the user is initialized using the script for that gesture. Finally, the procedure terminates in a block 168 after the script and animation are concluded.

A flow chart shown in FIG. 10 includes the steps performed in creating an animation object in accord with block 166 of FIG. 9. The process starts in a block 180 and proceeds to a block 182 in which the system invokes a callback function. If the gesture was initiated automatically, the callback function is executed whenever the period of time randomly determined to apply between the previous automatic initiation of the gesture and the current initiation has elapsed. This function contains the code that performs the gesture's script by displaying the frames of the script in sequence to produce the animation. The callback function looks through the script for a script entry having a time cue that is greater than the interval of time elapsed since the animation object was first invoked. In a decision block 184, the procedure determines if this is the first time that this animation object was invoked (in the current instance). If so, a block 186 sets First_Time equal to Current_Time. Thereafter, or if this is not the first time that the animation object was invoked, a block 188 sets a parameter Delta_Time equal to the difference between Current_Time and First_Time. A block 190 then sets the parameter Script_Entry equal to the first entry in the animation script.

Next, in a block 192, a parameter Face is set equal to the parameter Script_Entry.Face, which corresponds to the frame number specified in the script of the bitmap file for the avatar. A decision block 194 determines if a parameter Script_Entry.Time_Cue is equal to zero, which occurs at the end of the script file, and if so, a block 196 sets the parameter Avatar_Face equal to the (neutral or normal) Face, i.e., equal to frame 19 in the above example. Block 196 is thus implemented at the end of the script, restoring the avatar to its neutral frame state. A block 198 deletes the animation object, i.e., terminates its execution. Thereafter, a block 200 concludes the procedure.

However, if the parameter Script_Entry.Time_Cue is not equal to zero, the script is not yet finished, and the logic proceeds to a decision block 202, which determines if the parameter Script_Entry.Time_Cue is greater than the Delta_Time. If not, the current script entry has already been executed and the procedure proceeds to a block 204 that sets the parameter Script_Entry equal to the next line in the script. The logic then loops back to decision block 194. If the determination made in decision block 202 indicates that the parameter Script_Entry.Time_Cue is greater than the parameter Delta_Time, the procedure continues at a block 206, which sets the Avatar_Face equal to Face, i.e., equal to the frame of the bitmap file previously designated in block 192. A block 208 then again invokes the animation object, starting the procedure once more at block 180, to select the next frame to be displayed, repeating until the condition in decision block 194 is met, which indicates that all entries of the script file have been processed. While the animation is being transmitted and displayed to the other participants in the chat session, it may be observed by the user on the monitor display screen, depending upon the view mode selected by the user. The user may selectively view his/her own avatar, or may view avatars of other participants in the chat session.

Another feature of the present invention enables a user to selectively determine if distant participants in the chat session will be hidden from the user. If this menu item is selected, the user can thus limit the participants in a chat session with whom the user will interact. In the preferred embodiment of the present invention, the host of the chat session determines the radius around each participant's avatar beyond which the avatars of other participants and the transmission from the other participants will not be evident to the user if the "hide distant members" (participants) menu option is selected by the user.

It is also contemplated that in subsequent preferred embodiments of the present invention, the user will be provided with further controls to limit the other participants and communications visible to the user. For example, the user can determine the participants with whom he/she will interact in a chat session by setting a proximity radius around his/her own avatar. Any avatars of other participants that are within the proximity radius will be "heard" and "seen" by the user. To determine the proximity radius, the user will select a menu item, causing a dialog box to be provided in which the user enters a nominal measure of the radius. Alternatively, the user may define the proximity radius using the mouse cursor to graphically encompass or surround the avatars of all those participants with whom the user selectively chooses to interact, i.e., to view their avatars and transmissions. The dialog box used for entering these options is discussed below. Alternatively, the user may directly select the participants whose avatars and communications will then be evident to the user, the avatars and communications of other participants being hidden from the user.

A flow chart in FIG. 11 includes the logical steps for implementing this aspect of the invention. Beginning with a start block 210, the logic proceeds to a block 212 in which the rendering of the avatars on monitor 38 is initiated. In a block 214, the program begins a loop that checks all of the participant avatars in the chat session. A decision block 216 determines if a specific avatar is outside a proximity radius selected by the user to limit the participants with whom the user will interact (or not in the group of avatars otherwise selected by the user). If the avatar is outside the proximity radius that was selected by the user, the logic proceeds to a decision block 218 to determine if the participant is in an exception list. In the current preferred embodiment, the exception list only includes the host for the chat session. However, it is contemplated that the exception list may also include the names (or other identification) of specific individuals with whom the user wants to interact in the current chat session. It is also possible to store the exception list for the user for use in subsequent chat sessions, so that avatar and communications of any participant in the exception list will always be evident to the user. A negative response to decision block 218 causes the avatar of the participant to be hidden from the user, as provided in a block 220.

A negative response to decision block 216 leads to a block 222 in which the participant's avatar is displayed in the graphic chat world on the user's monitor. Similarly, if the participant is within the exception list referenced in decision block 218, the avatar of that participant is also displayed on the user's monitor in block 222. A block 224 ends the loop after all avatars have been checked in this manner. The procedure terminates in a block 226.

Similarly, a flow chart shown in FIG. 12 is used to determine whether the user's monitor will display text messages that are received from other participants of the chat session. The logic starts in a block 230, proceeding to a block 232 in which a message is received from one of the other participants in the chat session. A decision block 234 determines if the avatar for the participant from whom the message was received is outside the proximity radius determined by the user (or otherwise selected) to define the group of participants with whom the user wants to interact. If the avatar is outside the proximity radius (or not among those participants otherwise selected by the user), a decision block 236 determines if the avatar represents one of the participants that is in the exception list identifying participants with whom the user has chosen to always interact. If so, or if the avatar of the participant is inside the proximity radius (or among those participants otherwise selected by the user), a block 238 displays the message on the user's monitor that was received from the other participant. If not, a block 240 indicates that the message is ignored, so that the user does not see it displayed on his/her monitor. Following either blocks 238 or 240, the logic concludes in a block 242.

FIG. 13 illustrates a window 250 showing an example of an opening graphic chat session in a virtual world or room 252 called "ARCHES." As the user joins the graphic chat session taking place, he/she enters the virtual space looking at an avatar 254 representing the host of the chat session. Avatar 254 welcomes the user with an introductory text message shown in a history pane 262.

In this example of a virtual world, a plurality of floating grids 258 support arches 256. Participants in the chat session can move from grid to grid and can use the Shift-Up or Shift-Down key to move their avatars up or down relative to the floating grids. Messages that are transmitted to the user are displayed and scrolled in the history pane. Text that has scrolled out of view in the history pane can be accessed by the user by moving a scroll box 266 in a scroll bar 264 in the history pane.

The user can enter text to be transmitted to other participants in the chat session in text box 150, as noted above. In addition, the nature of the text message that is prepared by the user can be identified by selecting the appropriate text bubble (and optionally choosing an appropriate gesture to be transmitted with the text by selecting one of the emoticons 140 from a toolbar 268).

Other participants in the chat session are listed in a list box 260. The user's name and symbol will be added to list box 260 after he/she receives the introductory message, typically with a notation indicating that the user has just joined the chat session. At the bottom right corner of the window, a block 272 indicates the number of participants in the chat session. A menu 270 provides for controlling the user's interaction in the chat session.

Each chat session is normally monitored by a host. The host has control of the chat session and is provided with controls such as shown in FIG. 14 in a dialog box 280. In this dialog box, the host can indicate that one or more selected members are to be treated either as spectators or participants in the chat session, by choosing one of radio buttons 282 or 284. Normally, those joining the chat session are enabled to participate. If the number of participants in the chat session reaches a predetermined limit, any latecomers will normally be precluded from joining. In some chat sessions involving a guest personality, only the host and the guest are participants, and all others in the chat session are spectators. Only participants can generate messages to be transmitted and initiate gestures implemented by their avatars. In contrast, anyone designated as a spectator can receive transmissions from the participants and can observe the avatars of the participants, but are not represented in the chat session by avatars and cannot transmit messages or initiate gestures.

Before or after joining the chat session, a user can set specific options in a dialog box 300 as shown in FIG. 15. Check boxes 302 and 304 enable the user to indicate whether background sound and sound effects should be implemented. The user can also determine if he/she should be notified when members join the chat session, initiate a gesture, or leave the chat session by selecting check boxes 306, 308, and 310, respectively. When first joining a chat session, selecting a check box 312 will cause the user to be presented with an introduction such as that shown in chat history pane 262 in FIG. 13. Optionally, the chat history can be saved before the chat history pane is cleared or before the user exits the chat session by selecting a check box 314. Once the user has indicated the appropriate options, selecting a button 316 labeled "OK" applies the selected options. Alternatively, selecting a button 318 cancels the selections.

When joining a chat session, the user is presented with a dialog box 330, as shown in FIG. 16, that enables the user to limit interaction with other participants in the chat session. Radio buttons 332, 334, and 336 enable the user to select one of three options to limit the interaction in this manner. Choosing radio button 332 enables the user to select the participants who will be heard and seen from the list of participants, like that shown in list box 260 in FIG. 13. Choosing radio button 334 enables the user to choose participants with whom the user will interact using the cursor to select the avatars of those participants in the virtual world or room view. Choosing radio button 336 enables the user to select the partcipants by establishing the proximity radius around the user's avatar. If radio button 336 is selected, the user will be requested to enter the proximity radius in a text box 338. When a check box 340 is selected, the user can define the exception list, which determines the participants with whom the user will always interact, regardless of the proximity radius entered or the participants selected from the list box for this chat session. A control button 342 applies the selections made in this dialog box, while a control button 344 cancels the selections.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for communicating a gesture by an avatar that represents a participant in an on-line graphic chat session, comprising the steps of:
   (a) providing an animation in which the avatar appears to move in a defined manner that conveys the gesture, said gesture being determined by the participant to convey at least one of a pluarily of different personality traits and/or current emotions;
   (b) during an idle period for the participant in the chat session, when the avatar is otherwise inactive, automatically initiating the animation without requiring any input by the participant; and
   (c) during an active period for the participant in the chat session, when the avatar is performing a selected action, automatically initiating another animation in which the avatar appears to move in a defined manner that conveys another gesture, the other gesture being determined by the participant to convey at least one of a plurality of different personality traits and/or current emotions.

2. The method of claim 1, further comprising the steps of providing the participant with a plurality of avatars; and enabling the participant to select the avatar that will represent the participant in the on-line chat session.

3. The method of claim 1, wherein the animation comprises gestures that are indicative of a personality trait and/or an emotion.

4. The method of claim 1, further comprising the step of enabling the participant to select and initiate an animation employing the avatar, said animation conveying a desired emotion and/or state of mind to another participant in the chat session.

5. The method of claim 4, wherein the animation selected by the participant to convey the desired emotion and/or state of mind is displayed simultaneously in combination with a textual message that is transmitted by the participant.

6. A method for enabling a plurality of different gestures to be implemented by a plurality of different avatars that represent participants in an on-line graphic chat session, comprising the steps of:
   (a) providing a different script for each of the gestures, each script being applicable to all of the plurality of avatars used in the chat session, each gesture comprising a sequence of visual frames, said visual frames portraying different views of an avatar to produce a visual impression of an animation of said avatar when rapidly displayed in the sequence;
   (b) in the script for each gesture, indicating specific visual frames comprising the sequence and time intervals determining a duration for displaying each visual frame of the sequence; and
   (c) causing the avatars representing participants in the chat session to automatically implement desired gestures by selectively executing the scripts for the desired gestures, any change to a script to modify a desired gesture causing a corresponding change in said gesture for all of the different avatars executing said gesture.

7. The method of claim 6, wherein each of the plurality of avatars has at least one gesture associated with it that is automatically initiated from time to time when the avatar is otherwise inactive during the on-line chat session.

8. The method of claim 7, further comprising the step of enabling the participants in the chat session to select the gesture that is automatically initiated, each of said plurality of gestures indicating a different personality trait and/or emotion.

9. The method of claim 6, further comprising the step of enabling a participant to select a personality trait and/or emotion that will be indicated by one of the gestures to determine the gesture that will be implemented by the avatar representing the participant.

10. The method of claim 6, further comprising the step of enabling a participant to perceive communications from another participant in the chat session only if the other participant is represented by an avatar that is disposed within a defined distance of the participant's avatar.

11. The method of claim 6, further comprising the step of enabling the participant to visually perceive a gesture implemented by the avatar that represents the participant in the chat session.

12. A system for use in enabling a participant in an on-line chat session who is represented by an avatar to indicate at least one of a plurality of different personality traits and/or current emotions to others in the on-line chat session, comprising:
   (a) an interface to a network on which the on-line chat session is being run, said interface enabling the participant to transmit and receive data over the network;
   (b) a display for displaying a graphic representation of a virtual space in which the on-line chat session is occurring;
   (c) a memory for storing machine instructions; and
   (d) a central processor for executing the machine instructions, said machine instructions, when executed by the central processor, causing the central processor to control the interface and the display, so that;
      (i) an animation is provided for the avatar in the virtual space, said animation comprising a plurality of frames played in sequence so that the avatar appears to move in a defined manner within said virtual space, said movement by the avatar representing a gesture when viewed by others participating in the on-line chat session that conveys at least one of the plurality of different personality traits and/or current emotions;
      (ii) during an idle period for the participant in the chat session, when the avatar representing said participant is otherwise inactive, the animation is automatically initiated; and
      (iii) during an active period for the participant in the chat session, when the avatar representing the participant is performing a selected action, automatically initiating another animation in which the avatar appears to move in a defined manner that conveys another gesture, the other gesture being determined by the participant to convey at least one of a plurality of different personality traits and/or current emotions.

13. The system of claim 12, wherein the machine instructions executed by the central processor further provide the participant with a plurality of avatars; and enable the participant to select the avatar that will represent the participant in the on-line chat session.

14. The system of claim 12, wherein the machine instructions executed by the central processor further enables the participant to select the animation that is initiated during the idle period from a plurality of different animations, each animation indicating a different personality trait and/or emotion.

15. The system of claim 12, wherein the machine instructions executed by the central processor further enable the participant to selectively initiate an animation that conveys a desired emotion and/or state of mind of the participant to another participant in the chat session.

16. The system of claim 15, wherein the animation selected by the participant to convey the desired emotion and/or state of mind of the participant is simultaneously activated in combination with a textual message that is transmitted by the participant.

17. A system for enabling a plurality of different gestures to be implemented by a plurality of different avatars that represent participants in an on-line graphic chat session, comprising:
   (a) an interface to a network on which the chat session is being run, said interface enabling a participant to transmit and receive data over the network;
   (b) a display for displaying a graphic representation of a virtual space in which the chat session is occurring;
   (c) a memory for storing machine instructions; and
   (d) a central processor for executing the machine instructions, said machine instructions, when executed by the central processor, causing the central processor to control the interface and the display, so that:
      (i) a different script is provided for each of the gestures, each script being applicable to all of the plurality of avatars used in the chat session, each gesture comprising a sequence of visual frames, said visual frames portraying different views of an avatar to produce a visual impression of an animation of said avatar when rapidly displayed on the display in the sequence;
      (ii) in the script for each gesture, specific visual frames comprising the sequence and time intervals determining a duration for displaying each visual frame of the sequence are indicated; and
      (iii) the avatars representing participants in the chat session are caused to automatically implement desired gestures by selectively executing the scripts for the desired gestures, any change to a script to modify a desired gesture causing a corresponding change in said gesture for all of the different avatars executing said gesture.

18. The system of claim 17, wherein the avatar has associated with it a script that determines a sequence of the visual frames employed to produce a gesture that is automatically initiated when the avatar is otherwise idle.

19. The system of claim 17, wherein each avatar is associated with a graphic file comprising a predefined number of visual frames, said script referencing specific frames in the graphic file so that different views of the avatar indicated by the script are displayed when the script is executed to implement a gesture.

20. A method for enabling a participant in a graphic on-line chat session who is represented by an avatar to restrict communication with others participating in the on-line chat session, comprising the steps of:
   (a) providing the participant with an identification of other persons currently participating in the on-line chat session;

(b) enabling the participant to select specific persons that are currently participating in the on-line chat session from whom the participant will perceive communications during the on-line chat session; and (c) precluding the participant from perceiving communications from other than the selected specific persons, during the on-line chat session.

21. The method of claim 20, wherein the step of enabling the participant to select the specific persons comprising the step of providing a user interface tool that enables the participant to indicate a defined space adjacent to the avatar that represents the participant, so that only communications from any of the other persons participating in the on-line chat session who are represented by an avatar disposed within said defined space will be perceived by the participant.

22. The method of claim 21, wherein the participant is provided with a graphic control to set a radius around the avatar representing the participant to define said space.

23. The method of claim 20, wherein the step of enabling the participant to select specific persons that are currently participating in the on-line chat session comprises the step of enabling the participant to select the avatars representing any of the other persons who are participating in the on-line chat session, using a graphic pointing device.

24. The method of claim 20, wherein the step of enabling the participant to select specific persons that are currently participating in the on-line chat session comprises the step of enabling the participant to select the specific persons from a list of participants in the on-line chat session.

25. The method of claim 20, wherein the participant selects the specific persons by using a pointing device to trace a path defining a perimeter of a defined space in which the avatars representing the specific persons are disposed.

26. A method for enabling a participant in a graphic on-line chat session who is represented by an avatar to restrict communication with others participating in the on-line chat session, comprising the steps of:

(a) providing the participant with an identification of other persons participating in the on-line chat session;

(b) enabling the participant to select specific persons from whom the participant will perceive communications during the on-line chat session, the participant employing a graphic control to set a radius around the avatar representing the participant to indicate a defined space adjacent to the avatar, so that only communications from any of the other persons participating in the on-line chat session who are represented by an avatar disposed within said defined space will be perceived by the participant; and (c) precluding the participant from perceiving communications from other than said specific persons, during the on-line chat session.

27. A method for enabling a participant in a graphic on-line chat session who is represented by an avatar to restrict communication with others participating in the on-line chat session, comprising the steps of:

(a) providing the participant with an identification of other persons participating in the on-line chat session;

(b) enabling the participant to select specific persons from whom the participant will perceive communications during the on-line chat session, the participant using a pointing device to trace a path defining a perimeter of a defined space in which the avatars representing the specific persons are disposed; and (c) precluding the participant from perceiving communications from any person represented by an avatar that is disposed outside said perimeter, during the on-line chat session.

28. A method for communicating a gesture by an avatar that represents a participant in an on-line graphic chat session, comprising the steps of:

(a) providing an animation in which the avatar appears to move in a defined manner that conveys the gesture, said gesture being determined by the participant;

(b) during an idle period for the participant in the chat session, when the avatar is otherwise inactive, automatically initiating the animation without requiring any input by the participant; and (c) enabling the participant to perceive communications from another participant in the chat session only if the other participant is represented by an avatar that is disposed within a defined distance of the participant's avatar.

29. A method for enabling a plurality of different gestures to be implemented by a plurality of different avatars that represent participants in an on-line graphic chat session, comprising the steps of:

(a) providing a different script for each of the gestures, each script being applicable to all of the plurality of avatars used in the chat session, each gesture comprising a sequence of visual frames, said visual frames portraying different views of an avatar to produce a visual impression of an animation of said avatar when rapidly displayed in the sequence;

(b) in the script for each gesture, indicating specific visual frames comprising the sequence and time intervals determining a duration for displaying each visual frame of the sequence;

(c) causing the avatars representing participants in the chat session to implement desired gestures by selectively executing the scripts for the desired gestures; and (d) enabling a participant to automatically perceive communications from another participant in the chat session only if the other participant is represented by an avatar that is disposed within a defined distance of the participant's avatar.

30. A system for use in enabling a participant in an on-line chat session who is represented by an avatar to indicate a personality trait and/or an emotion to others in the on-line chat session, comprising:

(a) an interface to a network on which the on-line cat session is being run, said interface enabling the participant to transmit and receive data over the network;

(b) a display for displaying a graphic representation of a virtual space in which the on-line chat session is occurring;

(c) a memory for storing machine instructions; and (d) a central processor for executing the machine instructions, said machine instructions, when executed by the central processor, causing the central processor to control the interface and the display, so that;

(i) an animation is provided for the avatar in the virtual space, said animation comprising a plurality of frames played in sequence so that the avatar appears to move in a defined manner within said virtual space, said movement by the avatar representing a gesture when viewed by others participating in the on-line chat session;

(ii) during an idle period for the participant in the chat session, when the avatar representing said participant is otherwise inactive, the animation is automatically initiated; and (iii) the participant is enabled to perceive communications from another participant in the chat session only if the other participant is represented by an avatar that is disposed within a defined distance of the participant's avatar.

31. A method for enabling a participant in a graphic on-line chat session who is represented by an avatar to restrict communication with others participating in the on-line chat session, comprising the steps of:

(a) providing the participant with an identification of other persons participating in the on-line chat session; and (b) enabling the participant to select specific persons from whom the participant will perceive communications during the on-line chat session by employing a user interface tool to indicate a defined space adjacent to the avatar that represents the participant so that the participant only perceives communications from the specific persons participating in the on-line chat session who are represented by an avatar disposed within the defined space.

* * * * *